May 24, 1927.

C. D. HYATT

TONGS

Filed March 13, 1926

1,630,013

INVENTOR
Charles D. Hyatt
BY Chappell & Earl
ATTORNEYS

Patented May 24, 1927.

1,630,013

UNITED STATES PATENT OFFICE.

CHARLES D. HYATT, OF COLDWATER, MICHIGAN, ASSIGNOR TO HOMER FURNACE COMPANY, OF COLDWATER, MICHIGAN.

TONGS.

Application filed March 13, 1926. Serial No. 94,558.

The main object of this invention is to provide a pair of tongs which is well adapted for use in removing clinkers from furnaces and the like.

A further object is to provide a pair of tongs which may be conveniently manipulated to effectively grasp objects in relatively inaccessible positions.

Objects pertaining to details and economies of my invention will definitely appear from the detailed description to follow. The invention is clearly defined and pointed out in the claims.

A structure embodying the features of my invention is clearly illustrated in the accompanying drawing forming a part of this application, in which.

Figure 1:
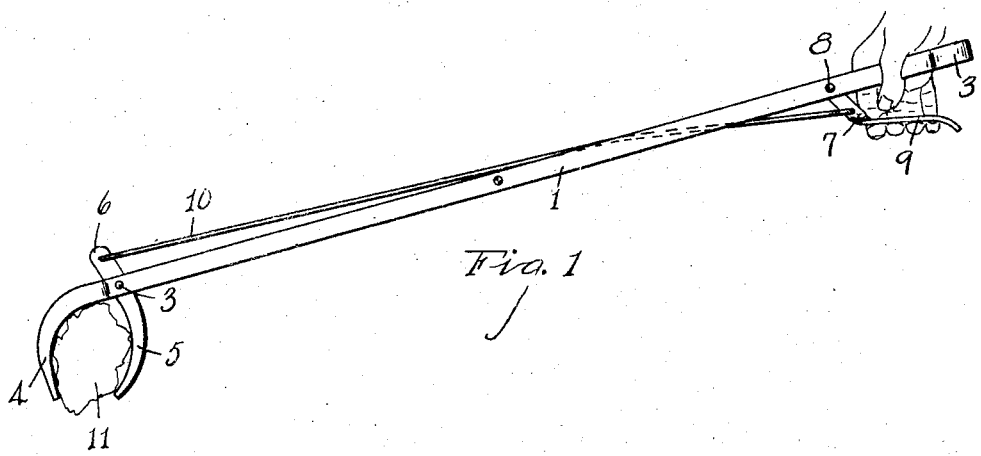
Fig. 1 is a side elevation of my improved tongs, the tongs being shown gripping an object.
Figure 2:
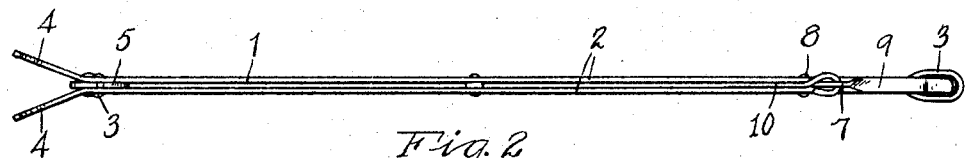
Fig. 2 is a top view thereof.
Figure 3:
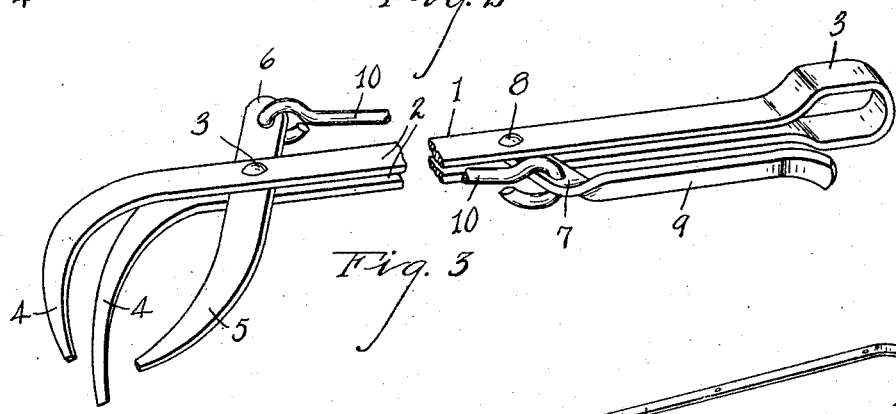
Fig. 3 is a fragmentary side perspective view.

Referring to the drawing, a handle designated generally by the numeral 1 is made up of a pair of bars 2 disposed in parallel spaced relation, the bars being connected at their outer ends by the loop 3 which is of such size or width as to provide an effective hand hold to support the hand and facilitate grasping the same, see Fig. 1.

At the outer ends the bars are formed into downwardly curved diverging fixed jaws 4. A movable jaw 5 formed of a flat bar or piece of metal is mounted between the bars 2 on a pivot 3 extending through the bars and the jaw, thus supporting the jaw 5 in opposed relation to the fixed jaw and to swing in a central plane between the same. The upper end of the jaw 5 projects above the handle as at 6.

A movable jaw actuating lever 7 is pivoted at 8 between the bars 2 to swing below the handle, this lever having a hand grip portion 9 disposed to be grasped as indicated in Fig. 1. The link 10 connects the upwardly projecting end 6 of the movable jaw with the lever 7, this link being arranged or passed between the bars 1.

Figure 4:
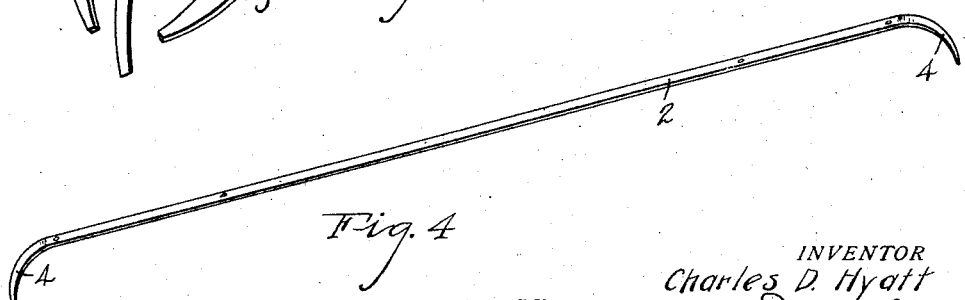
Fig. 4 is a perspective view of a bar from which the handle and fixed jaws are formed illustrating a step in the manufacture of the tongs.

With the parts thus arranged the tongs are effectively balanced and a powerful grip may be had upon an object such as a piece of slag indicated at 11 in Fig. 1. The structure is strong and durable and very economical in its parts and the assembling thereof. In manufacture the fixed jaws 4 and the handle bars are formed of a piece of bar material as shown in Fig. 4, this being folded upon itself.

Having thus described my invention what I claim as new and desire to secure by Letters Patent is:

1. In a pair of tongs, the combination of a handle comprising a pair of bars disposed in spaced parallel relation and terminating in curved diverging fixed jaws, said bars being united at their outer ends by a loop providing a hand grip, a coacting movable jaw pivoted between said bars in opposed relation to said fixed jaws with its upper end projecting above the handle, an actuating lever pivotally mounted between the said bars adjacent their outer ends and having a hand-piece opposed to said grip portion of said handle, and a link connecting the upper end of said swinging jaw to said lever, said link being disposed between said bars.

2. A pair of tongs comprising a handle formed of a pair of bars disposed in spaced parallel relation and terminating at their outer ends in a pair of fixed jaws, a coacting movable jaw pivoted between said bars with its upper end projecting above the same, an actuating lever for said movable jaw pivoted between said bars and having a hand piece disposed in operative relation to said handle, and a link disposed between said bars and connected to the upper end of said movable jaw and to said lever below said handle.

In witness whereof I have hereunto set my hand.

CHARLES D. HYATT.